(12) United States Patent
Haimer et al.

(10) Patent No.: US 7,115,846 B2
(45) Date of Patent: *Oct. 3, 2006

(54) SHRINKING ARRANGEMENT FOR TOOL HOLDER HAVING AN INDUCTION-HEATING ARRANGEMENT

(75) Inventors: Franz Haimer, Igenhausen (DE); Josef Haimer, Igenhausen (DE); Wolfgang Kügle, Aichach-Griesbeckerzell (DE)

(73) Assignee: Franz Haimer GmbH, Igenhausen (DE)

(*) Notice: Subject to any disclaimer, the term of this patent is extended or adjusted under 35 U.S.C. 154(b) by 0 days.

This patent is subject to a terminal disclaimer.

(21) Appl. No.: 11/043,054

(22) Filed: Jan. 27, 2005

(65) Prior Publication Data

US 2005/0188522 A1 Sep. 1, 2005

Related U.S. Application Data

(62) Division of application No. 10/275,974, filed as application No. PCT/EP00/04645 on May 22, 2000, now Pat. No. 6,861,625.

(51) Int. Cl.
*H05B 6/14* (2006.01)
*B23K 13/01* (2006.01)

(52) U.S. Cl. ............ 219/635; 219/661; 219/676; 279/102; 29/447

(58) Field of Classification Search ........... 219/635, 219/676, 660–667, 674, 647; 279/102, 158; 29/447, 800, 701
See application file for complete search history.

(56) References Cited

U.S. PATENT DOCUMENTS 2,643,325 A * 6/1953 Body et al. ............ 219/639
4,580,616 A   4/1986 Watts
4,625,090 A * 11/1986 Pfaffmann et al. ....... 219/644
5,127,780 A   7/1992 Massa
5,140,666 A   8/1992 Lamb
5,856,716 A   1/1999 Coupart et al.
6,216,335 B1 * 4/2001 Freyermuth ............ 29/701
6,861,625 B1 * 3/2005 Haimer et al. .......... 219/607

FOREIGN PATENT DOCUMENTS

| DE | 922 700 C | 5/1954 |
| DE | 298 20 838 U1 | 4/1999 |
| DE | 198 44 018 A1 | 3/2000 |
| EP | 0 437 322 A2 | 7/1991 |

(Continued)

OTHER PUBLICATIONS

International Search Report.

*Primary Examiner*—Philip H. Leung
(74) *Attorney, Agent, or Firm*—Rothwell, Figg, Ernst & Manbeck

(57) ABSTRACT

A shrinking arrangement for a tool holder is provided which retains a rotary tool with a press fit in a central accommodation opening. The arrangement includes an induction-heating arrangement for thermally expanding the tool holder in the region of the accommodating opening. The induction-heating arrangement includes an induction-coil unit which is guided on a vertical guide column such that it can be displaced with its coil axis vertical and which is connected, in particular via a flexible cable, to an induction-current generator which is fixed in relation to the column, and in that arranged on the induction-coil unit is a contact switch which can be actuated manually and by means of which the supply of induction current to the induction-coil unit can be switched on and off in a freely selectable manner at least for a limited period of time.

2 Claims, 8 Drawing Sheets

FOREIGN PATENT DOCUMENTS

| | | |
|---|---|---|
| EP | 0 830 917 A1 | 3/1998 |
| FR | 1 524 221 | 5/1968 |
| FR | 2 768 071 A1 | 3/1999 |

* cited by examiner

SHRINKING ARRANGEMENT FOR TOOL HOLDER HAVING AN INDUCTION-HEATING ARRANGEMENT

CROSS REFERENCE TO RELATED APPLICATION

This application is a divisional of U.S. application Ser. No. 10/275,974 filed Nov. 19, 2002, now U.S. Pat. No. 6,861,625, which a National Phase Entry Application of PCT/EP00/04656, filed May 22, 2000.

DESCRIPTION

The invention relates to a shrinking arrangement for at least one tool holder which retains a rotary tool with a press fit in a central accommodating opening.

It is known, for example from WO 94/07646 A1 or EP 0 830 917 A1 or DE 298 20 838 U1, for tool holders which retain the shank of a rotary tool, for example of a drill bit or of a milling cutter or the like, with a press fit in a central accommodating opening to be widened by heating in the region of said accommodating opening in order for it to be possible to insert or remove the shank of the tool. A gas flame or an electric resistance-heating collar which can be brought into abutment contact with the tool holder may serve as the heating source. Particularly suitable are induction coils which are supplied with alternating current or pulsed direct current, are positioned centrally on the region of the tool holder which is to be heated and transformer-induce eddy currents in the tool holder. Such induction-heating devices have the advantage that the tool holder does not have to be in contact with the coil for the heating operation.

For sufficiently high levels of thermal expansion, the tool holder has to be heated to a few 100° C., for example from 250° C. to 350° C. In the case of sufficiently powerful heating means, the heating phase of the shrinking operation can be kept relatively short, by way of which it is also possible to avoid overheating of the tool holder or else of the tool. In the case of conventional shrinking arrangements, however, the cooling phase of the tool holder is comparatively long. It is thus known, in order to accelerate the cooling, for a cooling body to be positioned on the tool holder and for this cooling body to be exposed to the air stream produced by a fan. Despite the air cooling, the cooling phase of the shrinking operation nevertheless still lasts several minutes.

The object of the invention is to demonstrate a way in which the shrinking time of a shrinking arrangement of the type explained above can be shortened to a considerable extent.

In order to achieve this object, the invention is based on a shrinking arrangement for at least one tool holder which retains a rotary tool with a press fit in a central accommodating opening, having a heating arrangement which is designed, in particular, as an induction-heating arrangement and is intended for thermally expanding the tool holder in the region of the accommodating opening. The invention is characterized in that provided for the purpose of cooling the region of the accommodating opening of the tool holder is a cooling arrangement with at least one cooling collar through which liquid coolant can flow and which can be positioned on the tool holder, in contact therewith. Such cooling collars are considerably smaller than conventional cooling bodies used for air-cooling purposes and, on account of the higher heat-adsorption capacity of the liquid coolant, reduce the cooling time to fractions of a minute, for example 30 seconds. The operating speed at which tools can be inserted into the tool holder or removed therefrom can be increased to a considerable extent in this way in comparison with conventional shrinking arrangements.

Water suffices as the liquid coolant. In the simplest case, the cooling collar may be connected to a water-supply line of a building. In order for it to be possible to operate independently of the locations of water-supply-line connections of a building, the cooling arrangement nevertheless preferably comprises a cooling subassembly which leads the liquid coolant in a closed cooling circuit through the cooling collar or cooling collars.

The shrinking arrangement is expediently assigned a plurality of cooling collars, be this in order to have available for operational purposes cooling collars for different tool-holder diameters or in order for it to be possible to cool a plurality of tool holders in overlapping time periods. The cooling collars may be connected in parallel to the liquid-coolant circuit, but the cooling collars are preferably arranged in series one behind the other in the cooling circuit since, as a result, the supply-line outlay which is necessary for connecting purposes can be reduced.

The cooling collars may be provided in the stationary manner on the shrinking arrangement; expediently, however, they are connected to flexible liquid-coolant tubes and can move freely, which facilitates handling. The cooling collar may be positioned on the hot tool holder without the latter having to be removed from its mount, in which it has been heated, as is necessary in the case of conventional shrinking arrangements with air cooling.

In a preferred configuration, the shrinking arrangement has a turret plate which can be rotated about an, in particular, vertical axis of rotation and has a plurality of mounts for tool holders which, each retained in one of the mounts, can be moved one after the other through the operating region of the heating arrangement and of the cooling arrangement. It is also the case that the cooling collar or the cooling collars are connected to flexible liquid-coolant tubes, with the result that they can follow the rotary movement of the plate. Without having to remove the heated tool holders from their mounts, the period of time in which the heated tool holders are cooled can already be utilized for heating the next tool holder.

The turret plate expediently has a direction-of-rotation lock which blocks the rotary movement in a predetermined direction of rotation, in particular from the region of the heating arrangement in the direction of the operating side of the shrinking arrangement. In this way, heated tool holders can only be moved away from the operator, which reduces the risk of injury.

The mounts of the turret plate may be firmly connected to the turret plate for operational purposes, or else the turret plate comprises guides or securing means in which the mounts for the tool holders are each retained such that they can be exchanged for operational purposes. In order to make it easier for a plurality of mounts to be exchanged, there is expediently provided a hub, which is essentially central in relation to the axis of rotation of the turret plate and has a plurality of accommodating bodies, which form the mounts, are retained with play on the hub and are guided in guides of the turret plate. In this way, all the mounts of the turret plate can be exchanged in one operation. The play of the accommodating bodies ensures that they cannot jam in the guides on account of thermal expansion.

In a comparatively simple configuration; which can nevertheless be operated straightforwardly and efficiently, the heating arrangement has an induction-coil unit which is guided on a vertical guide column such that it can be displaced with its coil axis vertical and which is connected, e.g. via a flexible cable, to an induction-current generator which is fixed in relation to the column. Arranged on the induction-coil unit is a contact switch which can be actuated manually and by means of which the supply of induction current to the induction-coil unit can be switched on and off in a freely selectable manner at least for a limited period of time. In this configuration, which is suitable for single-handed operation, the induction current is only switched on manually until such time as the tool can be pushed into the accommodating opening of the tool holder. For this purpose, the tool holder is arranged with its axis vertical, with the result that the tool can penetrate into the accommodating opening either on account of its weight or with manual assistance. The tool holder is thus only heated to precisely the extent which is necessary, which, on the one hand, avoids overheating of the tool holder and, on the other hand, allows short cooling times. It goes without saying, however, that the induction-current generator predetermines an actuating-time limit, in order to rule out overheating damage as a result of carelessness.

The induction-coil unit can preferably be arrested in a selectable vertical position on the guide column by means of an arresting clamping arrangement which can be released counter to spring prestressing. Since the arresting clamping arrangement, in the non-actuated state, clamps on account of spring forces, accidental release is ruled out. For single-handed operation, the arresting clamping arrangement may have a handle which is arranged close enough to the contact switch for single-handed operation and is intended for releasing the arresting action.

The cooling collar has to fulfill two requirements. On the one hand, it has to ensure good heat transfer from the tool holder to the liquid coolant and, on the other hand, despite certain tolerances of the tool-holder abutment surfaces intended for it, it has to ensure the largest possible surface-area abutment contact, to be precise even when, as is often customary in the case of tool holders, the abutment surface is more or less conical. The cooling collar fulfils these requirements if it has a sleeve element which is intended for contact abutment against the tool holder and has a radially continuous slit, extending axially over the entire sleeve length, and is firmly connected to walls of a liquid-coolant channel or integrally forms walls or wall sections of a liquid-coolant channel. On account of the slit, the sleeve element is able to adapt itself to the tool holder. Since the sleeve element is in direct thermal contact with the liquid coolant, optimum heat transfer is ensured. The liquid-coolant channel may be a tube coil which is fastened on the sleeve element by soldering or welding or by some other thermal-contact method. It is more favorable if the liquid-coolant channel is bounded by integral surface regions of the sleeve element.

Mechanically stable embodiments which can also absorb relatively high levels of thermal stressing are obtained if the inner sleeve element, which is intended for contact abutment against the tool holder, is covered over in a sealed manner in the radially outward direction by an outer sleeve element, at least one groove being integrally formed, for the above-mentioned reasons, in the inner and/or the outer sleeve element for the purpose of forming the liquid-coolant channel. The groove is expediently formed in meandering fashion in the inner and/or the outer sleeve element, which allows comparatively large heat-exchanging surfaces. The thickness of between adjacent sections of the groove running one beside the other and/or the thickness of the sleeve element in the region of the base of the groove is expediently smaller than the transverse dimension of the groove radially and/or axially in relation to the cooling collar. Such sleeve elements are comparatively pliable and are able to adapt themselves particularly well to the outer casing contour of the tool holder. The groove is preferably provided on the outer casing of the inner sleeve element, while the outer sleeve element has an inner casing which complements the outer-casing contour of the inner sleeve element in a closely fitting manner. It is not only the case that such a groove can be easily produced; rather, it also has the advantage that it runs in the vicinity of the tool holder, which facilitates the heat transfer.

The outer sleeve element may be designed as an essentially cylindrical sleeve which is closed in the form of a ring, and it is thus easy to produce. It is sufficient if the inner sleeve element is flexible, which is readily made possible by a suitable elastomeric seal between the two sleeve elements. The outer sleeve element may then be rigid, with the result that it is also able to withstand rough treatment during operation.

In one variant, both the inner and the outer sleeve elements each have a both axially and radially continuous slit, the slits being aligned with one another. Such a cooling collar then adapts itself overall to contour tolerances of the tool holder, to be precise even when the inner and the outer sleeve elements are designed as conical sleeves. It has proven expedient in this context if the slit or the slits of the cooling collar is prestressed by spring means circumferentially in the direction in which it narrows, in order to ensure firm abutment contact even in the case of comparatively flexible sleeve elements.

As an alternative to the slit cooling collar explained above, it is also possible for the latter to have a plurality of circumferentially adjacent sleeve segments, of which each is firmly connected to walls of a liquid-coolant channel section or forms walls or wall sections of the liquid-coolant channel section. The sleeve segments are connected elastically to one another in the circumferential direction and it is also the case that the liquid-coolant channel sections provided in the individual sleeve segments, for their part, are connected to one another, in particular connected in series with one another, for the purpose of forming the liquid-coolant channel. Such a segmented cooling collar is able to adapt itself particularly well to the circumferential contour of the tool holder. For the elastic connection of the sleeve segments, it is possible to provide an annular spring which is seated in a groove of the sleeve segments and also, at the same time, fixes the sleeve segments axially in relation to one another.

As has already been explained above for slit sleeve elements, it is also the case with sleeve segments that each liquid-coolant channel section may be formed by a, for example, meandering tube or a groove formed in an inner or an outer sleeve segment. Here too, the groove is expediently formed in the inner sleeve segment. You are referred to the explanations regarding configurations with slit sleeve elements.

The induction-coil unit of the induction-heating arrangement should be configured such that it concentrates the magnetic field on the tool holder. Conventional induction-coil units thus mostly have a yoke arrangement which is made of ferromagnetic material, extends axially along the outer circumference of the induction coil and radially along at least one of the two axial end surfaces, and ensures that the magnetic field is concentrated in the interior of the induction coil. For adaptation of the induction-coil unit to different diameters of tool holders, it is conventionally possible to exchange either parts of the yoke arrangement or the induction-coil units as a whole. In a preferred configuration of such an induction-coil unit, which can also be used for shrinking arrangements other than those explained above and thus has independent inventive importance, it is provided that those regions of the ferromagnetic yoke arrangement which are adjacent to the tool-insertion end and/or remote from the tool-insertion end have a plurality of yoke elements which are made of ferromagnetic material, project radially inward beyond the inner circumference of the induction coil, are guided such that they can move relative to one another and of which the radial projection beyond the inner circumference of the induction coil can be changed for operational purposes. In this way, the yoke-arrangement opening which is intended for accommodating the tool or the tool holder can be adapted to the current size of the tool or of the tool holder without the induction-coil unit, or parts thereof, having to be changed. The induction-coil unit can thus be used universally.

The yoke elements may be guided such that they can be displaced or pivoted relative to one another, and they expediently overlap for better guidance of the magnetic flux.

It could be conceived for the yoke elements to be adjusted individually in each case. More user friendly variants are ones in which the yoke elements can be adjusted by means of a common control element, which can be rotated equiaxially in relation to the induction coil and is coupled to the yoke elements via control-surface/cam-follower arrangements. By means of said control element, which is designed, for example, as a control plate arranged in an axis-normal manner in relation to the induction coil, the inside opening width of the yoke arrangement can be adapted for operational purposes to the tool holder which is currently to be shrunk.

In order for it to be possible for the tool for the shrinking operation to be introduced more easily into the accommodating opening of the tool holder, the tool holder expediently has, at the inlet of its accommodating opening, a widening into which the tool shank can be inserted in a centered manner prior to the thermal expansion of the tool holder. A centering widening of this type is described, for example, in EP 0 830 917 A1. The centering widening, however, reduces the torque-transmitting surface of the accommodating opening of the tool holder and should thus have the shortest possible axial extent. If, however, the centering widening is of short dimensions, then the tool jams upon insertion if it is placed in position with its axis tilted. EP 0 830 917 A1 thus proposes an additional introduction aid which is intended to prevent such axis-tilting errors.

The risk of the tool jamming in the tool holder if it is inserted in a tilted manner is reduced if the accommodating opening of the tool holder has, at its tool-insertion end, a radially inwardly projecting annular bead which is concentric in relation to the axis of the accommodating opening and, at an axial distance from the annular bead, a cylindrical clamping region which can be widened by thermal expansion and is intended for the tool shank, the axial-longitudinal-section contour of the annular bead, at all locations, being spaced apart from the axis of the accommodating opening by a radial distance which is greater than the internal diameter of the clamping region, and there being provided between the annular bead and the clamping region a conical transition region which widens in the direction of the annular bead. Such a tool holder, which can also be used for shrinking arrangements other than those explained above, and which thus has independent inventive importance, ensures that the tool shank is pre-centered on the annular bead, to be precise even when the tool shank is introduced into the annular bead with a tilting error. The conical transition region provided between the annular bead and the clamping region sets the tool in the upright state when the tool shank is further inserted, and compensates for tilting errors of the tool regardless of diameter tolerances of the tool shank. The axial distance between the locations at which the tool shank abuts against the annular bead, on the one hand, and against the conical transition region, on the other hand, is relatively large, despite the extent of this entire introduction region being comparatively small, and ensures not just pre-centering of the tool shank relative to the tool holder, but also the non-tilting guidance of the same until the clamping region is thermally expanded to a diameter which allows the tool shank to be introduced. The axial extent of the conical transition region here is expediently smaller than ten times, preferably smaller than five times of the axial extent of the annular bead. In order to facilitate the initial introduction of the tool shank the annular bead has a contour which is preferably in the form of a circle segment in axial longitudinal section and the largest diameter of the conical transition region is also preferably larger than the smallest inside diameter of the annular bead.

Exemplary embodiments of the aspects of the invention are explained hereinbelow with reference to a drawing, in which.

Figure 1:
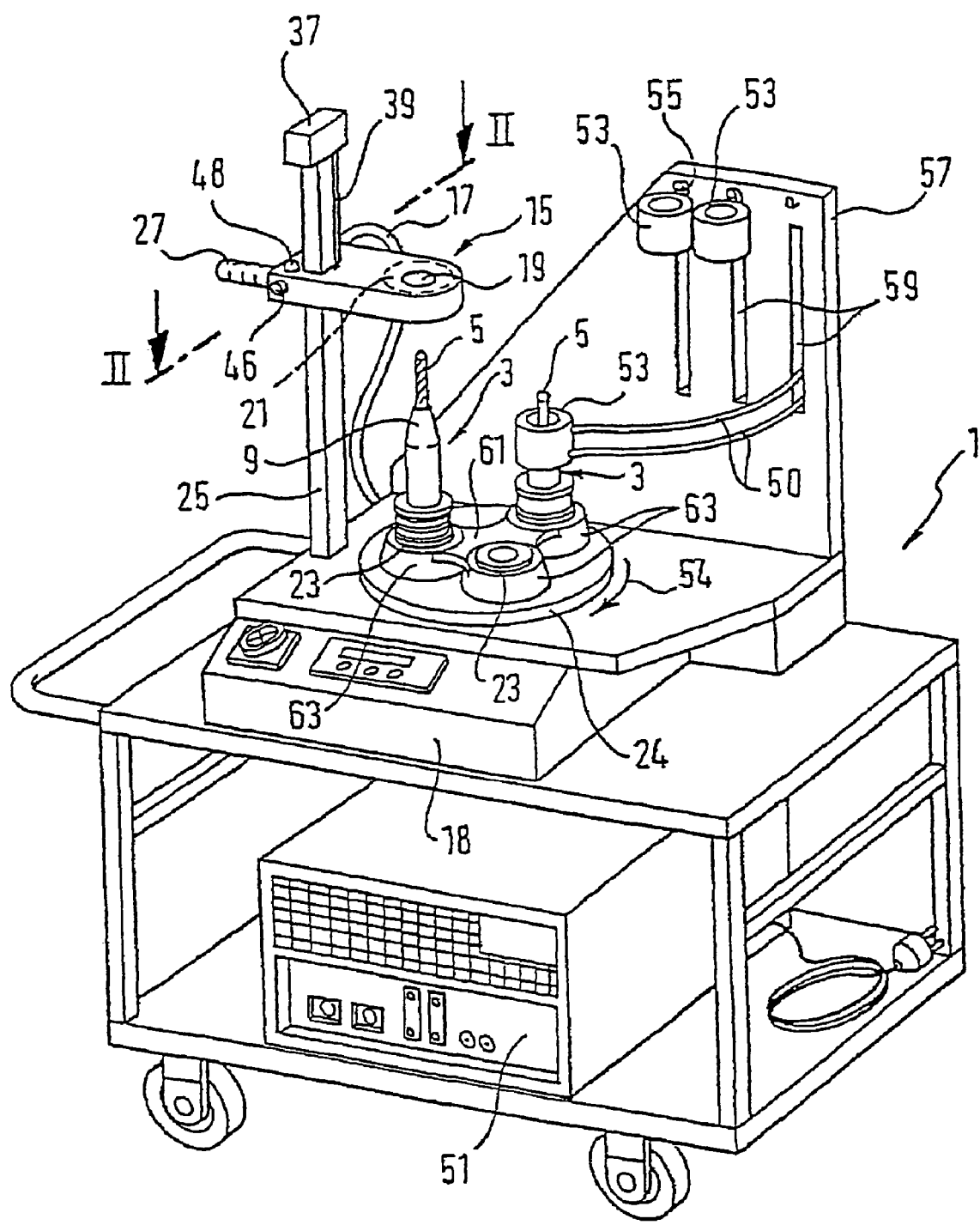
FIG. 1 shows a perspective illustration of an exemplary embodiment of a shrinking apparatus according to the invention for shrinkable tool holders of rotating tools.
Figure 21:
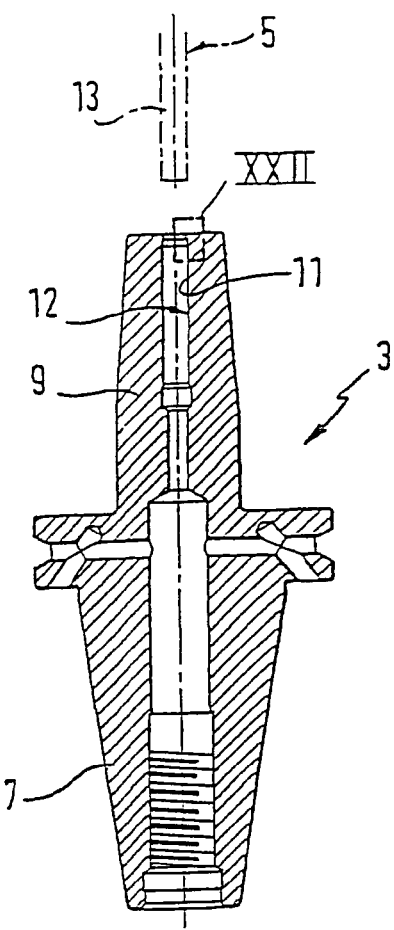
FIG. 21 shows an axial longitudinal section through an exemplary embodiment of a tool holder, for a rotating tool, which can be used in conjunction with the shrinking apparatus from FIG. 1.

FIG. 1 shows a transportable-unit shrinking apparatus 1 for tool holders 3 of rotating tools 5, for example drill bits or milling cutters. Such tool holders, as for example FIG. 21 shows, have a connection shank 7, for example in the form of a steep-taper shank or of a hollow steep-taper shank or the like, by means of which they can be clamped centrally into a machine tool, and also have, located axially opposite the connection shank 7, a tool-accommodating region 9 with a central, essentially cylindrical accommodating opening 11 for the shank 13 of the tool 5. In a clamping region 12 of the tool holder 3, the internal diameter of the accommodating opening 11 is somewhat smaller than the external diameter of the shank 13, with the result that the accommodating region 9 of the tool holder 3 has to be heated before, on account of the thermal expansion, the shank 13 of the tool 5 can be introduced into the clamping region 12 of the accommodating opening 11. Once the accommodating region 9 has been cooled, the shank 13 is then seated with a press fit in the tool holder 3.

The shrinking apparatus 1 (FIG. 1) is capable of heating an accommodating region 9 of the tool holder 3 within a few seconds (e.g. 10 seconds) to a sufficient extent, for example to temperatures of 300° C., and then of cooling it to ambient temperature in a comparatively short period of time (e.g. 30 seconds).

For heating the accommodating region 9, the shrinking apparatus 1 has an induction-coil unit 15, which is supplied from an induction-current generator 18 via a flexible cable 17. In the exemplary embodiment illustrated, the induction-current generator 18 generates alternating currents or pulsed direct currents with a preferably changeable frequency of between 50 Hz and a few kHz, e.g. 20 kHz, which, when the induction-coil unit 15 is positioned essentially centrally on the accommodating region 9 of the tool holder 3 by way of the interior 19 of its induction coil 21, which will be explained in more detail hereinbelow, induces eddy currents in the metal body of the tool holder 3 and heats the latter inductively. It is possible for the induction-current generator 18 to be of conventional construction and to comprise, for example, a frequency converter which is supplied, for example, from a direct-current link and can be adjusted in its output and its frequency.

For the shrinking operation, the tool holder 3 is seated, with its axis vertical and its accommodating opening 11 directed upward, in a mount or opening of an accommodating body 23 on a turret plate 24, which will be explained in more detail hereinbelow and can be rotated about a vertical axis, to be precise in axial alignment with the induction coil 21 of the induction-coil unit 15 which, for its part, is guided such that it can be displaced manually on a vertical guide column 25. The induction-coil unit 15 comprises, as FIG. 2 also shows, a handle 27 which, on the one hand, facilitates the handling of the induction-coil unit 15 during the vertical adjustment movement and, on the other hand, makes it possible to unlock a frictional arresting arrangement of the induction-coil unit 15 which clamps automatically when at rest. For this purpose, the handle 27 is fixed on a pin 31 such that it can be tilted about a pivot axis running transversely to the guide column 25, and is prestressed by a spring 33, supported on the induction-coil unit 15, against the guide column 25, which overlaps the handle 27. In the overlapping region, the handle 27 bears a frictional element 35. If the handle 27 is tilted counter to the prestressing of the spring 33, then the frictional element 35 lifts up from the guide column 25 and the induction-coil unit 15 can be displaced along the guide column 25. The handle 27 allows both the displacement operation of the induction-coil unit 15, and the release of the clamping arresting arrangement 29, by a single hand. In order to facilitate the handling further, there is arranged, at the top end of the guide column 25, a spring motor 37 (FIG. 1) which drives a cable-winding drum (not illustrated specifically) with a cable, which is guided along the guide column 25 to the induction-coil unit 15, in the winding-up direction. The spring motor 37 compensates at least partially for the weight of the induction-coil unit 15.

Figure 2:
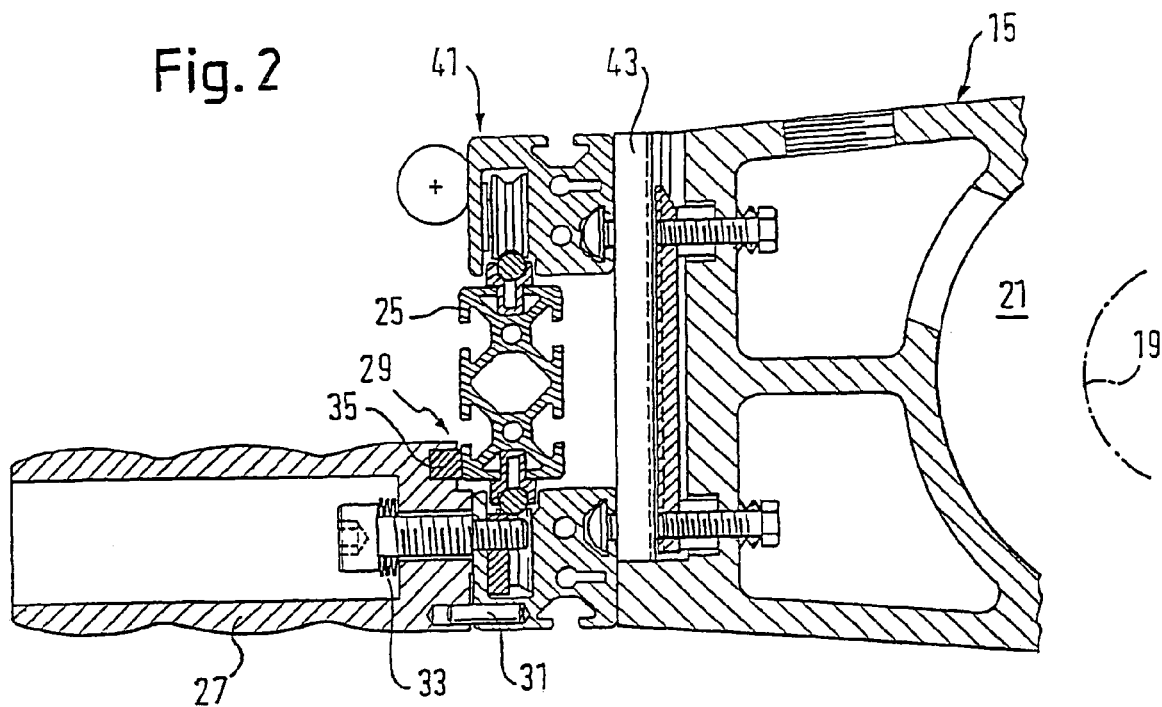
FIG. 2 shows a sectional view through an induction-coil unit of the shrinking apparatus, as seen along line II—II in FIG. 1.
Figure 3:
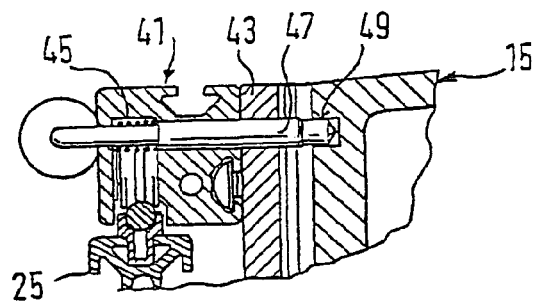
FIG. 3 shows a section, in detail form, through the induction-coil unit.
Figure 15:
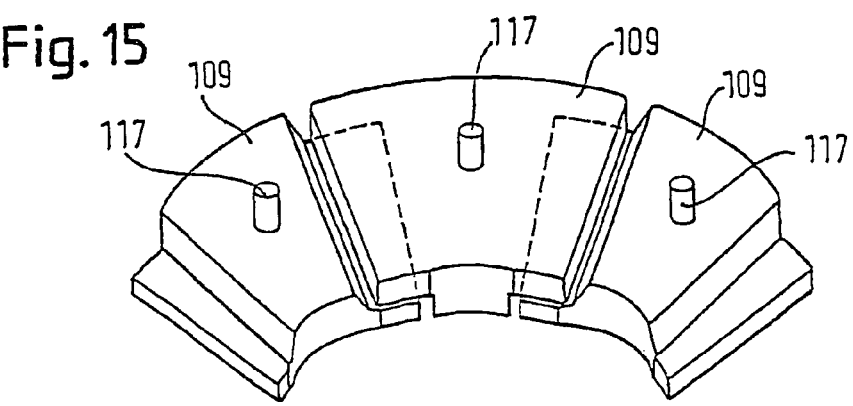
FIG. 15 shows a view, in detail form, of yoke elements of the induction-coil unit from FIG. 12.

As FIGS. 2 and 3 show, the induction-coil unit 15 is retained on the guide column 25 such that it can be removed for operational purposes, with the result that the induction-current generator 18 can be connected to different induction-coil units 15. The handle 27 including the clamping arresting arrangement 29, for this purpose, are- fitted on a carriage 41 which can be displaced, by way of ball bearings, along the guide column 25 and fixes the induction-coil unit 15 such that it can be displaced by means of a dovetail guide rail 43 running transversely to the guide rail 25. An arresting pin 47, which is guided in the carriage such that it can be displaced counter to a spring 45, fixes the induction-coil unit 15 on the carriage 41 by releasable engagement in a latching cut-out 49 of said induction-coil unit.

For the heating operation, the tool holder 3 is inserted into the accommodating body 23 of the turret plate 24, and the induction-coil unit 15 is lowered from the raised position, which is illustrated in FIG. 1, until the induction coil 21 encloses the accommodating region 9. By pushing a contact switch 46, which is arranged on the induction-coil unit 15 close enough to the handle 27 for single-handed operation, a supply of induction current to the induction coil 21 is switched on, which is indicated by an indicator lamp 48, likewise arranged on the induction-coil unit 15, for the duration of current flow. The induction current flows during the freely selectable actuating period of the switch 46. The induction-current generator 18 only switches the current off following a predetermined safety period, in order to prevent unintended heating damage to the tool or tool holder. The operator of the shrinking apparatus 1 actuates the contact switch 46 only until such time as the tool 5 sinks down into the vertically oriented accommodating opening 11 of the tool holder 3 either of its own accord or with slight manual assistance. Immediately thereafter, the induction current can be switched off and unnecessary heating of the tool holder 3 can be avoided.

In order to eliminate the need for removing the tool holder 3 from the accommodating body 23 for the following cooling phase, the accommodating body 23, for its part, is arranged on the turret plate 24 and, together with the latter and the tool holder 3 seated in the accommodating body 23, is moved into a position in which a cooling collar 53, which is supplied with liquid coolant from a cooling subassembly 51 via flexible tubes 50, is positioned, with surface-area abutment, on the accommodating region 9 of the tool holder 3. The surface-area abutment contact of the inner casing of the cooling collar 53 against the outer casing of the accommodating region 9 of the tool holder 3 and the cooling of the cooling collar 53 by the liquid coolant circulating in a closed circuit through the cooling collar 53 and the cooling subassembly 51 ensure very rapid cooling of the tool holder 3 to ambient temperature. In order to rule out burns from the tool holder seated to a few 100° C., the turret plate 24 is provided with catches which act in dependence on the direction of rotation and allow rotation only in the direction of rotation indicated by an arrow 54, in which the tool holders 3 is moved, away from the operator side of the shrinking apparatus 1, from the heating position beneath the induction-coil unit 15 into the position intended for the positioning of the cooling collar 53.

As FIG. 1 shows, the turret plate 24 bears, distributed over its circumference, more than two, in this case three, accommodating bodies 23, and the cooling subassembly 51 also supplies a plurality of cooling collars 53 at the same time. This makes it possible for a plurality of tool holders to be cooled at the same time without the inductive heating of the tool holders being obstructed as a result. The cooling collars 53 have eyelets 55, by means of which they are suspended in a removable manner on a retaining wall 57 of the shrinking apparatus 1. Furthermore, slots 59 are also provided in the retaining wall, the liquid-coolant tubes 50 of the cooling collars 53 being guided in a longitudinally displaceable and ordered manner in said slots.

The cooling collars 53 may have different internal diameters and different inner shapes, depending on the tool holders 3 which are to be cooled; it is also possible, however, for them to have the same dimensions, if only one and the same type of tool holder is to be shrunk. It is also possible for the accommodating bodies 23 to be retained in a removable manner on the turret plate 24. In the exemplary embodiment illustrated, the three accommodating bodies 23 are fastened with play on a common hub 61, with the result that the group of these accommodating bodies 23 may be exchanged as a unit. The play of the hub fastening prevents jamming of the accommodating bodies 23 in the centering rings 63 provided for accommodating the accommodating bodies 23 on the turret plate 24.

The cooling subassembly 51 is preferably a subassembly which operates in accordance with the heat-pump principle, although other cooling subassemblies are also suitable. It is possible for the individual cooling collars 53 to be connected to the cooling subassembly in parallel with one another and, if appropriate, to be capable of being switched on and off individually. In the embodiment illustrated, the cooling subassemblies are connected in series in a common cooling circuit and are cooled by the liquid coolant irrespective of whether they are being used or not.

Figure 4:
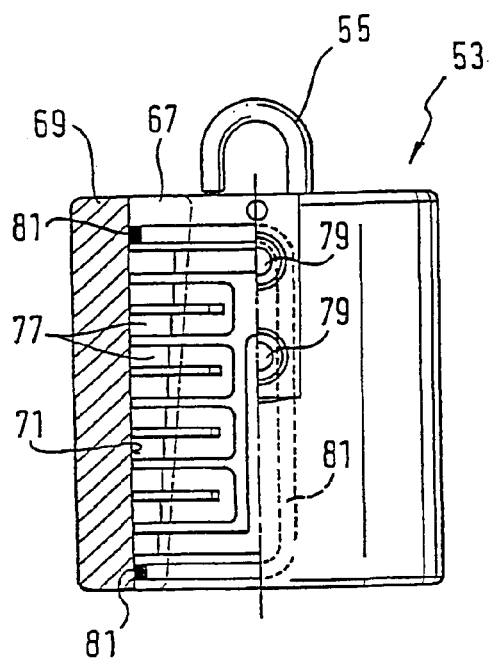
FIG. 4 shows a partially sectioned side view of a cooling collar of the shrinking apparatus.
Figure 5:
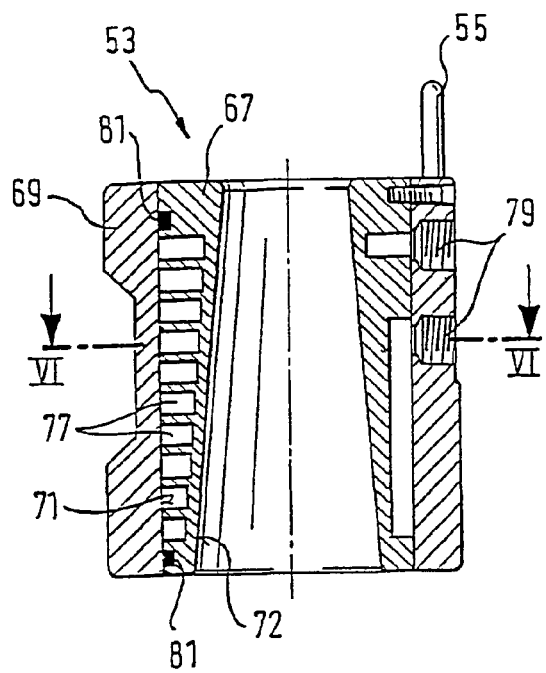
FIG. 5 shows an axial longitudinal section through the cooling collar, as seen along line V—V from FIG. 6.
Figure 6:
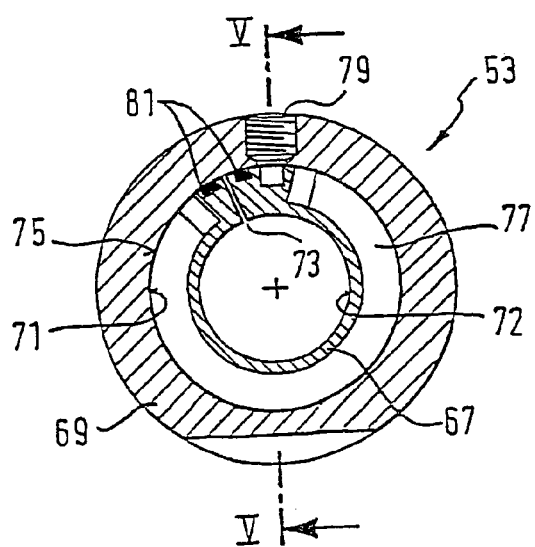
FIG. 6 shows an axial cross section through the cooling collar, as seen along line VI—VI in FIG. 5.

FIGS. 4 to 6 show details of the cooling collar 53. The cooling collar 53 comprise two sleeve elements 67, 69 which are arranged coaxially one inside the other and of which the outer sleeve element 69 is designed as a comparatively thick-walled and thus mechanically stable cylinder-tube section, closed in the form of a ring, and has a circular-cylindrical inner-casing surface 71. The inner sleeve element 67 has, in its tube wall, a both axially and radially continuous slit 73 and butts, by way of its circular-cylindrical outer circumferential surface 75, against the inner-casing surface 71 of the outer sleeve element 69. The inner-casing surface 72 of the inner sleeve element 67 is adapted in a closely fitting manner, in terms of its opening width and its cone angle, to the corresponding dimensions of the clamping or accommodating region 9 of the tool holder 3 which is to be cooled, with the result that, with the cooling collar 53 positioned on the tool holder 3, the inner sleeve element 67 is in direct abutment contact with the tool holder 3 over the largest surface area possible. In order to prevent jamming of the inner sleeve element 67 on the tool holder 3 and to allow the abutting surfaces of the inner sleeve element 67 and of the tool holder to be adapted in shape, the wall of the inner sleeve element 67 contains a both radially and axially continuous, axially extending slit 73.

The outer casing 75 of the inner sleeve element 67 contains a meandering groove 77 which does not overlap with the slit 73 and terminates at connection openings 79 for the cooling tubes 50, said connection openings extending through the outer sleeve element 69 (FIG. 1). The groove 77, together with the inner casing 71 of the outer sleeve element 69, forms a liquid-coolant channel within the cooling collar 53. That region of the outer-casing surface 75 of the inner sleeve element 67 which is covered over by the groove 77 is covered over by a sealing ring 81 which is closed in the form of a ring and extends in the circumferential direction along the axial ends of the inner sleeve element 67, on the one hand, as well as axially on both sides of the slit 73. The sealing ring 81 seals the region of the groove 77 in the outward direction, to be precise such that the inner sleeve element 67 can still be deformed radially to some extent for compensating for dimensional tolerances of the conical inner-casing surface 72 in relation t the tool holder 3. In order to ensure sufficient elasticity of the inner sleeve element 67, the distance between the base of the groove 77 and the inner-casing surface 72 is approximately constant, and comparatively small, over the length of the groove 77. The radial and axial dimensions of the groove cross section here are greater than the regions of material between adjacent sections of the groove 77, on the one hand, and the radial thickness of the sleeve cross section in the region of the groove bases.

Variants of cooling collars which can be used for the shrinking apparatus from FIG. 1 instead of the cooling collar from FIGS. 4 to 6 are explained hereinbelow. Equivalent components are provided with the designations from FIGS. 4 to 6 and with a letter for differentiation purposes. For an explanation of the construction and functioning, you are referred to the respectively proceeding description, in particular of FIGS. 4 to 6.

Figure 7:
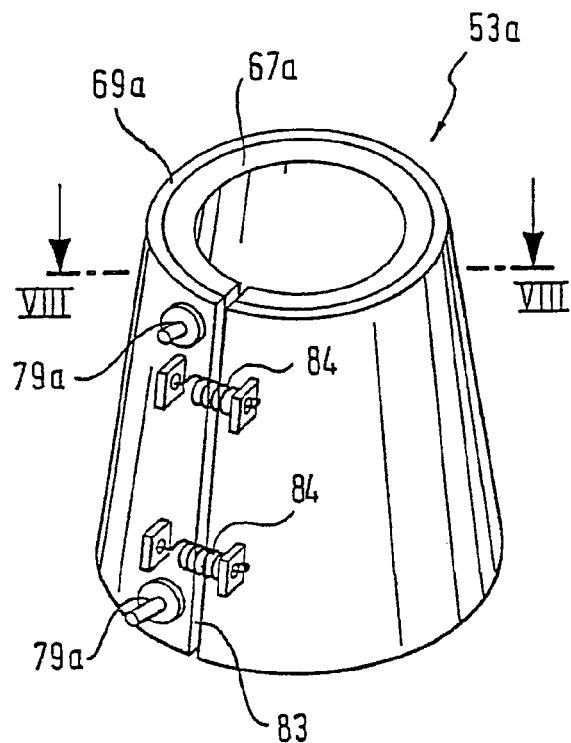
FIG. 7 shows a perspective illustration of a variant of the cooling collar.
Figure 9:
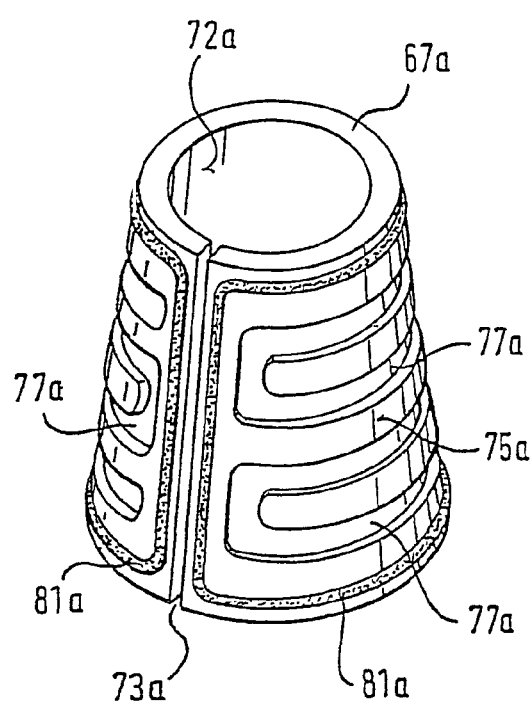
FIG. 9 shows a perspective illustration of an inner sleeve element of the cooling collar from FIG. 7.
Figure 8:
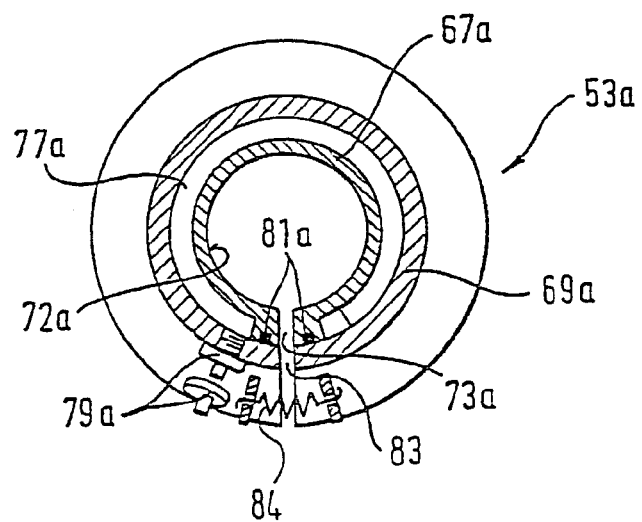
FIG. 8 shows an axial cross section through the cooling collar, as seen along line VIII—VIII in FIG. 7.

While the outer sleeve element 69 of the exemplary embodiment from FIGS. 4 to 6 is circular-cylindrical and does not have any slits, the outer sleeve element 69a of the cooling collar 53a illustrated in FIGS. 7 to 9 is designed as a conical sleeve and, accordingly, the inner sleeve element 67a has a conical outer casing 75a. The inner sleeve element 67a, in turn, has an axially and radially continuous, axially extending slit 73a. In alignment with this slit 73a, the outer sleeve element 69a is also provided with an axially and radially continuous slit 83 which, together with the slit 73a, makes it possible to compensate for expansion of the cooling collar 53a. Prestressing springs 84 act on the outer sleeve element 69a over the slit 83 and prestress the slit borders toward one another. The prestressing springs 84 may be fitted by their ends on the outer sleeve element 69a; however, it is also possible for the springs to be designed as annular springs which are closed in the form of a ring and enclose the sleeve element 69a.

Figure 10:
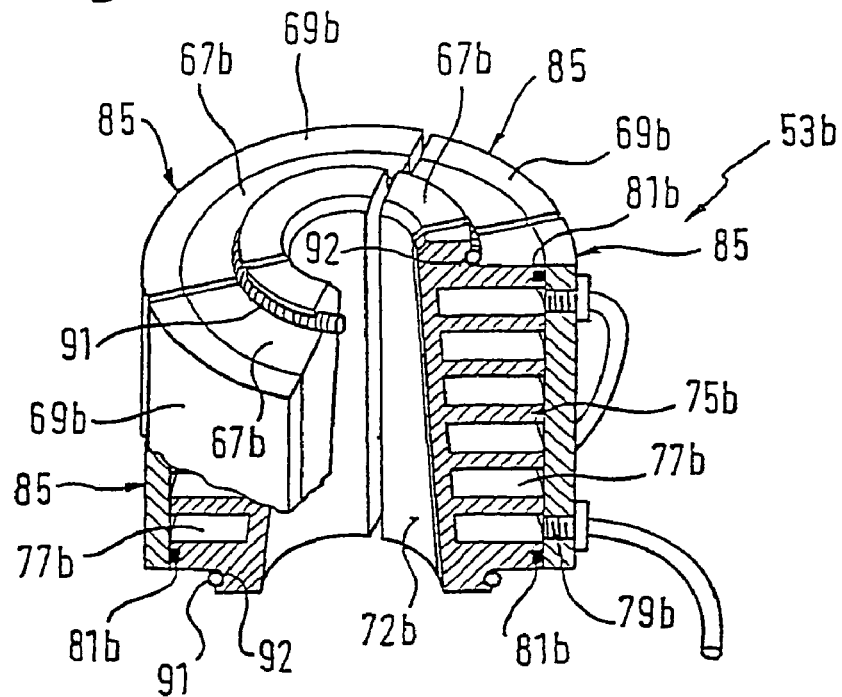
FIG. 10 shows a partially broken-away perspective illustration of a further variant of a cooling collar.
Figure 11:
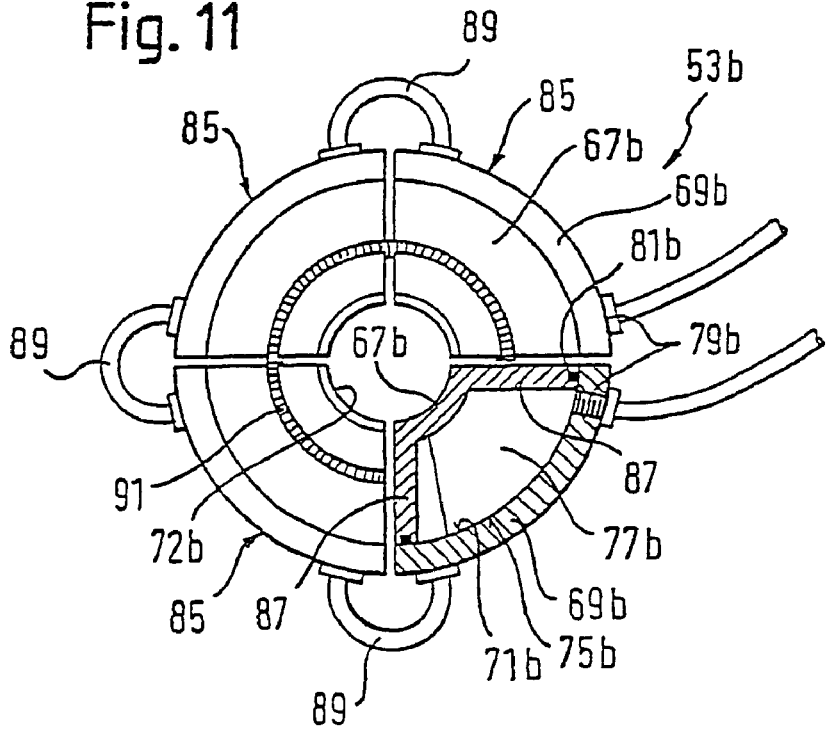
FIG. 11 shows a partially broken-away axial view of the cooling collar from FIG. 10.
Figure 12:
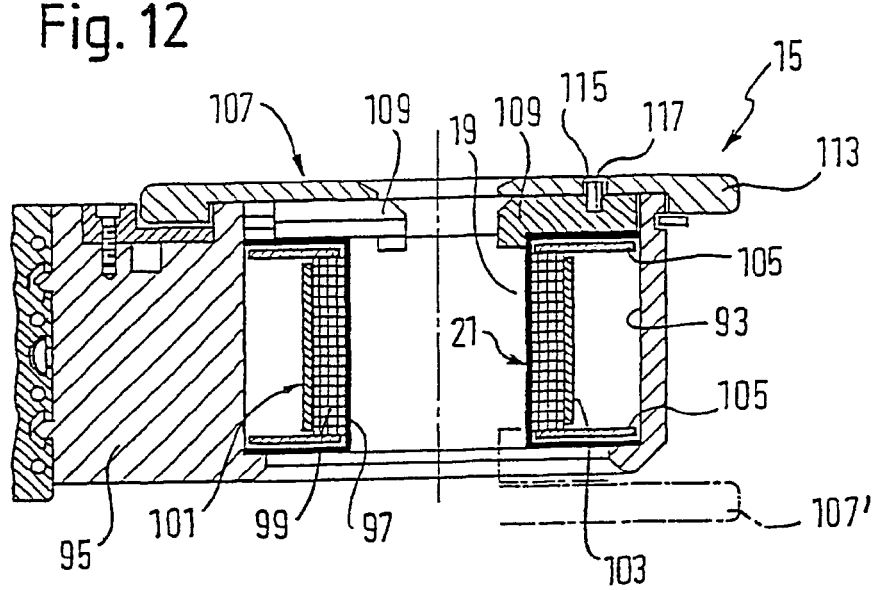
FIG. 12 shows an axial longitudinal section through an induction-coil unit which can be used in the shrinking apparatus from FIG. 1 and has an adjustable yoke arrangement.
Figure 13:
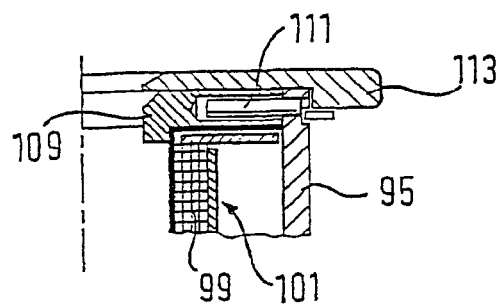
FIG. 13 shows a section, in detail form, through the induction-coil unit from FIG. 12.
Figure 14:
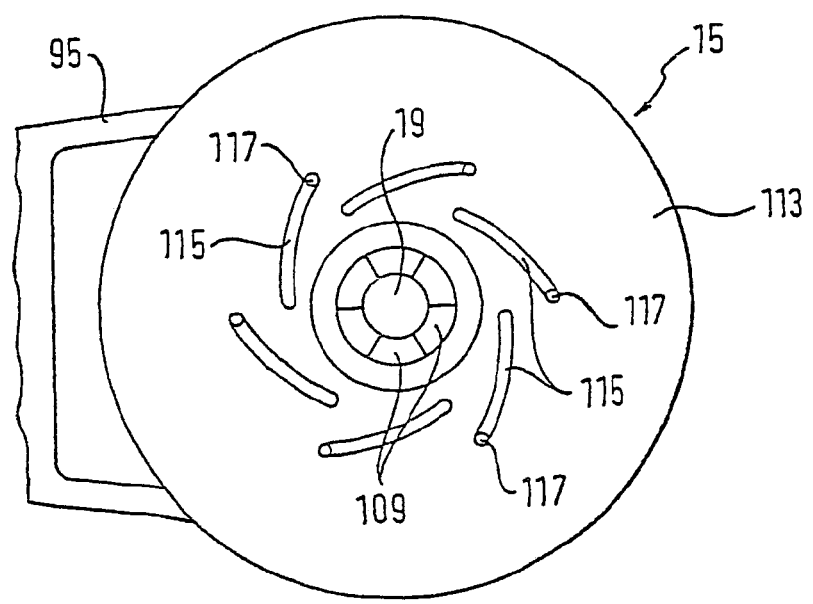
FIG. 14 shows an axial plan view of the induction-coil unit from FIG. 12.

The cooling collars explained above are constructed with the aid of sleeve elements which extend in one piece over the entire circumference, if appropriate, apart from an expansion slit. FIGS. 10 and 11 show a variant of a cooling collar 53b which are constructed from a plurality of, in this case four, in each case self-contained collar segments 85 each forming a cooling-channel section. Each of the collar segments 85 comprises an inner sleeve segment 67b, bounded by end walls 87 in a circumferential direction, and an outer sleeve segment 69b, of which the inner casing 71b is adapted to the outer casing 75b of the inner sleeve segment 67b. A meandering groove 77b is formed in the outer casing 75b of the inner sleeve segment 67b, in turn, in order to form a liquid-coolant channel which is closed off by the outer sleeve segment 69b. The ends of said groove are provided with connection openings 79b, extending through the outer sleeve segment 69b, for the liquid-coolant tubes 50 or else for a likewise flexible connecting tube 89, which connects the liquid-coolant section off one sleeve segment 85 to the liquid-coolant channel section of the circumferentially adjacent sleeve segment 85. Each of the sleeve segments 85 here is itself sealed by a sealing ring 81b, as has been explained above for the sealing ring 81.

In the case of the exemplary embodiment illustrated, the outer sleeve segments 69b are designed as segments of a circular-cylinder tube and the inner sleeve segment 67b, accordingly, has an outer contour in the form of a circular-cylinder segment, while the inner casing 72b is adapted to the outer contour of the tool holder and, for example, is conical. It goes without saying that the outer sleeve segment 69b may also be of conical configuration, as is illustrated in FIG. 7.

The sleeve segments 85 are held together in a radially elastic manner on both sides of the cooling collar 53b as seen in the axial direction, by in each case one annular spring 91, which encloses the end extensions of the inner sleeve segments 67b. The annular spring 91 may also be retained, if appropriate, on the outer sleeve segments 69b. The annular springs 91 here are seated, over at least half their spiral diameter, with a small amount of play in grooves 92 of the extensions, said grooves being aligned with one another in the circumferential direction, and, at the same time, ensure that the sleeve segments 85 are axially oriented and fixed in relation to one another.

FIGS. 12 to 15 show details of the induction-coil unit 15. The induction-coil unit 15 bears, in a circular-cylindrical accommodating opening 93 of a basic body 95 consisting of non-magnetic material, the wire winding 99 of the induction coil 21, said wire winding being wound on a coil body 97. In order to concentrate the magnetic field on the tool holder which is to be introduced into the interior of the winding 99, and is to be heated inductively, a yoke arrangement 101 made of ferromagnetic material, for example ferrite, is arranged on the outside of the winding 99. The yoke arrangement 101 has an axial yoke element 103 which encloses the outer circumference of the winding 99 in the form of a sleeve, is formed, if appropriate, from a plurality of spaced-apart plates and is adjoined by yoke elements 105 engaging radially beyond the axial ends of the winding 99. The yoke elements 105 may be designed as annular disks or else likewise as spaced-apart segment plates.

The internal diameter of the opening 19 is configured for the maximum diameter of the tool holders which are to be heated. In order to obtain sufficiently large induction currents even in the case of the winding 99 being spaced apart from the tool holder by a comparatively large radial distance, a pole-shoe arrangement 107, which projects radially into the opening 19 via the inner circumference of the winding 99 and has a variable internal diameter which can be adapted in a selectable manner to the external diameter of the tool holder for operational purposes, is seated at at least one axial end of the winding 99. The pole-shoe arrangement 107 has a multiplicity of preferably also circumferentially overlapping yoke elements 109 which are made of ferromagnetic material, for example ferrite material, are distributed in the circumferential direction of the winding 99 and are each guided individually such that they can be displaced radially on radial stubs 111 (FIG. 13) which are fixed in the basic body 95. Furthermore, a control plate 113 is guided on the basic body 95 such that it can be rotated equiaxially in relation to the induction coil 21 and, for each of the yoke elements 109, has a control slot 115 which runs obliquely in relation to the circumferential direction and in which there engages a cam-follower pin 117 projecting from the yoke element 109. By virtue of the control plate 113 being rotated, the yoke elements 109 can jointly be displaced radially into the opening 19 or drawn out therefrom. In this way, the inside diameter of the pole-shoe arrangement 107 can be changed for operational purposes by virtue of the control plate 113 being rotated.

In a fair number of embodiments, it is sufficient for a pole-shoe arrangement 107 of the type explained to be arranged on the top side of the induction coil 21, since this pole-shoe arrangement can then be made to overlap with the end side of the tool holder. 107' indicates a further pole-shoe arrangement on the underside of the induction coil 21, it being possible for this pole-shoe arrangement to be provided in addition, or else as an alternative, to the pole-shoe arrangement 107. If pole-shoe arrangements 107 or 107' are provided at the axial ends of the winding 99, it is also possible to dispense with the radial yoke elements 105 there.

Variants of pole-shoe arrangements as can be used for the induction-coil unit 15 from FIGS. 12 to 15 are explained hereinbelow. Equivalent components are designated by the designations used above and are provided with a letter for differentiation purposes. For an explanation of the construction and functioning, you are referred to the description above.

Figure 16:
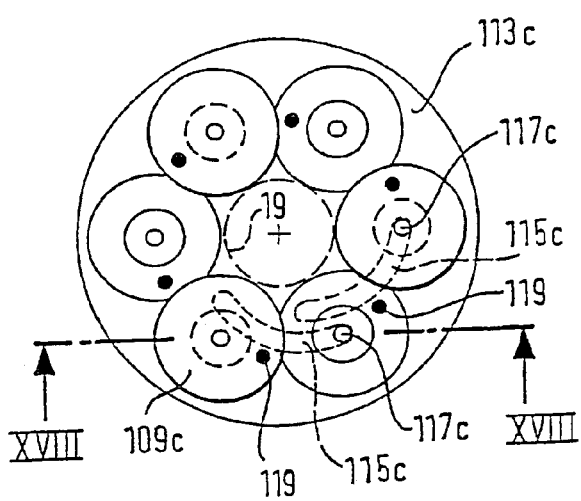
FIGS. 16 and 17 show schematic axial views of a variant of an adjustable yoke arrangement which can be used in the induction-coil unit according to FIG. 12.
Figure 17:
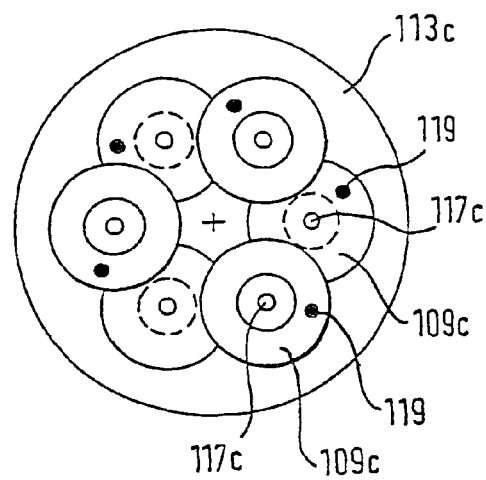
Figure 18:
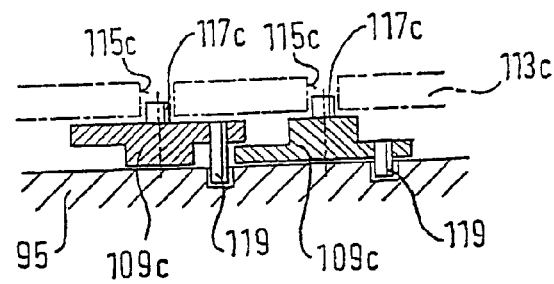
FIG. 18 shows a schematic sectional view of the yoke arrangement, as seen along line XVIII—XVIII in FIG. 16.

In the case of the pole-shoe arrangement from FIGS. 12 to 15, the yoke elements are guided such that they can be displaced radially on the basic body of the induction-coil unit. FIGS. 16 to 18 show a variant in which a plurality of yoke elements 109c in the form of circular disks are mounted on the basic body 95 such that they can be pivoted eccentrically in relation to their disk center on stubs 119 running parallel to the coil axis. Here too, the yoke elements 109c form a variable pole-shoe arrangement 107c which, by means of a control plate 113c which can be rotated centrally in relation to the coil axis, can be jointly pivoted into the opening 19 of the induction-coil unit or pivoted out of the same. For this purpose, the control elements 109c, in turn, have central cam-follower stubs 117c which are guided in slots 115c running obliquely in relation to the circumferential direction of the control plate 113c. FIG. 16 here shows the yoke elements 109c in the position in which they are remote from the coil axis, while FIG. 17 shows them in the position in which they are in the vicinity of the coil axis.

Figure 19:
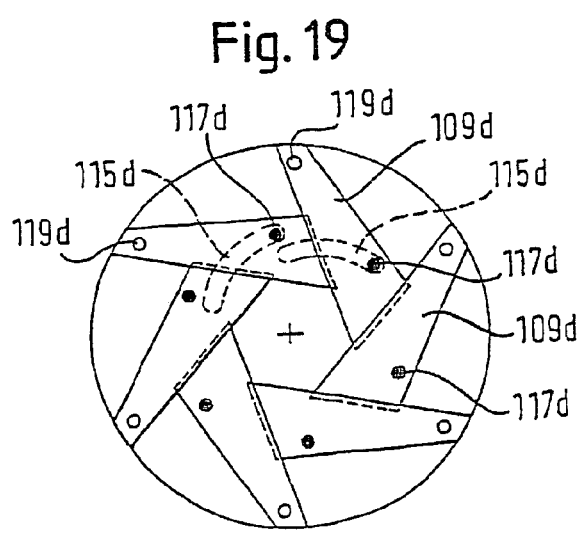
FIGS. 19 and 20 show schematic illustrations of a further variant of an adjustable yoke arrangement which can be used in the induction-coil unit from FIG. 12.
Figure 20:
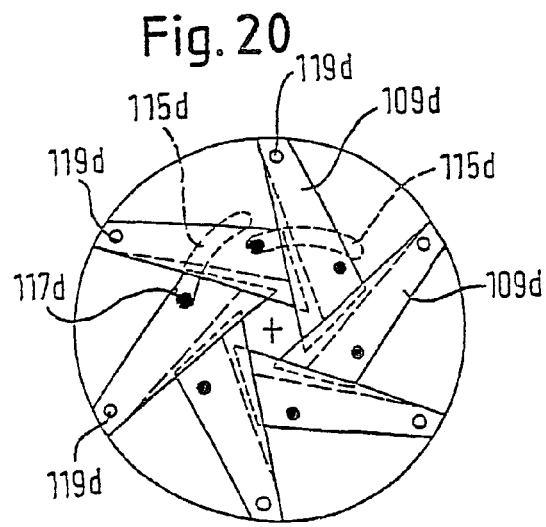

In the embodiment of FIGS. 16 to 18, the yoke elements are in the form of circular disks. FIGS. 19 and 20 show a variant in which the yoke elements are elongate and, at their end which is remote from the induction-coil axis, are mounted such that they can be pivoted in the end plane of the induction coil 21 by means of articulation pins 119d. The yoke elements 109d also bear cam-follower stubs 117d, which engage in slots 115d running obliquely in relation to the circumferential direction in a common control plate. FIG. 19 shows the yoke elements 109d in the position in which they are remote from the coil axis; FIG. 20 shows the yoke elements in the position in which they are in the vicinity of the coil axis.

Figure 22:
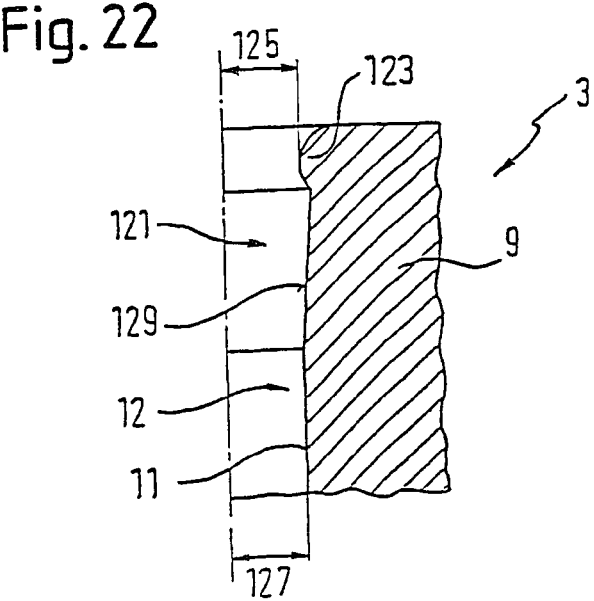
FIG. 22 shows an axial longitudinal section through a detail of the tool holder which is designated by an arrow XXII in FIG. 21.

In the shrinking arrangement according to FIG. 1, the tools 5 which are to be inserted into the tool holder 3 are inserted into the accommodating opening 11 from above, with their shank vertical, as soon as the accommodating opening 11 has been thermally expanded to a sufficient extent. As FIGS. 21 and 22 show, there is provided for this purpose, at the tool-introduction end of the accommodating opening 11, an introduction section 121, of which the minimum diameter is larger than that of the accommodating opening 11 and slightly larger than the external diameter of the tool shank 13 which is to be inserted into the accommodating opening 11. It is thus possible, even if the tool holder 3 is not yet thermally expanded, for the tool shank 13 to be inserted, by way of its bottom shank end, into the introduction region 121, where it is pre-centered relative to the accommodating opening 11.

If it is intended to achieve the situation where the tool shank 13 is retained upright in the introduction region 121 without jamming, that is to say can subsequently sink down into the thermally expanded accommodating opening 11 automatically or with a small amount of manual assistance, the introduction region 121 has to have a certain minimum length in the axial direction. On the other hand, the introduction region 121 must not be too long, since it reduces the torque-transmitting surface area of the accommodating opening 11 and thus the torque which can be transmitted by the tool holder. An extension of the accommodating opening 11 cannot always be achieved since the unsupported length of the tool holder 3 is increased as a result and the tool may end up vibrating during operation.

FIG. 22 shows details of a preferred configuration of the tool holder 3 which, with a comparatively short axial extent of the introduction region 121, not only facilitates the introduction of the shank 13 to a considerable extent, but, despite the short axial extent, can also center the shank 13 of the tool 5 in relation to the accommodating opening 11 in a manner which is essentially free of tilting errors. For this purpose, the introduction region 121 has, at the insertion end of the introduction region 121, an encircling annular bead 123 with a cross-sectional contour in the form of a circle segment in axial longitudinal section of the tool holder 3. The radial distance 125 between the annular bead 123 and the axis of rotation of the tool holder 3 is greater, at all locations of the annular bead 123, than the radius 127 of the accommodating opening 11, and thus also greater than the radius of the tool shank 13. Extending between the annular bead 123 and that end of the accommodating opening 11 which is in the vicinity of the insertion opening is a conical transition section 129, which essentially directly adjoins the annular bead 123 on one side and the clamping region 12 of the accommodating opening 11 on the other side. The smallest diameter of the transition region 129 thus corresponds to the diameter of the accommodating opening 11. The largest diameter of the transition region 129 is larger than the inside diameter of the annular bead 123.

Since the annular bead 123 has a contour in the form of a circle segment, but is at least convex, it is also possible for the tool shank 13, at least initially, to be introduced with a comparatively large tilting error in relation to the axis of the tool holder 3, it subsequently being set in the upright position upon contact with the conical transition region 129. The conical transition region has an axial extent which is not more than ten times, preferably less than five times, the axial extent of the annular bead 123. Although the axial length of the introduction region 121 can be kept short overall in this manner, the guidance length by which the tool shank 13 is set in the upright position is sufficiently long.

The invention claimed is:

1. A shrinking arrangement for a tool holder (3) which retains a rotary tool with a press fit in a central accommodation opening (11), the shrinking arrangement comprising:
   an induction-heating arrangement (15, 18) for thermally expanding the tool holder (3) in the region of the accommodating opening (11), wherein:
   the induction-heating arrangement (15, 18) includes an induction-coil unit 15) which is displaceably guided on a vertical guide column (25) with its coil axis extending vertically from an induction-current generator (18) which is fixed in relation to the guide column (25) and is connected to the induction-coil unit (15);
   an arresting clamping arrangement (29) for arresting the induction-coil unit (15) in a selectable vertical position on the guide column (25), wherein the arresting clamping arrangement (29) has a handle (27) intended for releasing the arresting action of the arresting clamping arrangement (29) in a single-handed operation; and
   a manually actuatable contact switch (46) by means of which the supply of induction current to the induction-coil unit (15) can be switched on and off in a freely selectable manner at least for a limited period of time, wherein the contact switch (46) is arranged on the induction-coil unit (15) proximate the handle (27) such that said contact switch (46) can be actuated in the single handed operation for releasing the arresting action.

2. The shrinking arrangement as claimed in claim 1, characterized in that the arresting clamping arrangement (29) can be released counter to spring prestressing.

* * * * *